(12) United States Patent
Don et al.

(10) Patent No.: US 10,552,060 B1
(45) Date of Patent: Feb. 4, 2020

(54) USING REPLICATION FACILITY TO PROVIDE SECURE HOST NETWORK CONNECTIVITY WHEREIN A FIRST LOGICAL DEVICE IS USED EXCLUSIVELY FOR SENDING MESSAGES FROM HOST TO SECOND HOST

(71) Applicant: EMC IP Holding Company LLC, Hopkinton, MA (US)

(72) Inventors: Arieh Don, Newton, MA (US); Ian Wigmore, Westborough, MA (US); Steve Smaldone, Woodstock, CT (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/497,718

(22) Filed: Apr. 26, 2017

(51) Int. Cl.
*G06F 3/06* (2006.01)

(52) U.S. Cl.
CPC ............ *G06F 3/0619* (2013.01); *G06F 3/061* (2013.01); *G06F 3/065* (2013.01); *G06F 3/067* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 5,544,347 A | 8/1996 | Yanai et al. | |
| 5,742,792 A * | 4/1998 | Yanai | G06F 3/0601 710/1 |
| 7,054,883 B2 | 5/2006 | Meiri et al. | |
| 7,581,048 B1 * | 8/2009 | Budd | G06F 11/201 710/38 |
| 2015/0067281 A1 * | 3/2015 | Jones | G06F 12/0284 711/156 |

* cited by examiner

*Primary Examiner* — William B Partridge
*Assistant Examiner* — Chie Yew
(74) *Attorney, Agent, or Firm* — Muirhead and Saturnelli, LLC

(57) ABSTRACT

Techniques for inter-host communication may include issuing a first message from a first host; and sending the first message from the first host to a second host. Sending the first message may include transmitting the first message indirectly to the second host over a first connection between a first data storage system and a second data storage system. The first connection may be used in connection with data replication to maintain a first device of the first data storage system and a second device of the second data storage system as synchronous mirrored copies of a first logical device. Multiple logical devices configured for synchronous replication may be used for inter-host communication. Alternatively, a single logical device configured for synchronous replication may be used for inter-host communication.

18 Claims, 12 Drawing Sheets

USING REPLICATION FACILITY TO PROVIDE SECURE HOST NETWORK CONNECTIVITY WHEREIN A FIRST LOGICAL DEVICE IS USED EXCLUSIVELY FOR SENDING MESSAGES FROM HOST TO SECOND HOST

BACKGROUND

Technical Field

This application generally relates to connectivity and communications between hosts and data storage systems.

Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell Inc. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of techniques herein is a method of performing inter-host communication comprising: issuing a first message from a first host; and sending the first message from the first host to a second host, wherein said sending includes: transmitting the first message indirectly to the second host over a first connection between a first data storage system and a second data storage system, wherein the first connection is used in connection with data replication to maintain a first device of the first data storage system and a second device of the second data storage system as synchronous mirrored copies of a first logical device. The first message may include first data sent from the first host to the second host, and said sending may include issuing a first write that writes the first data to a first logical address of the first logical device. The second host may receive the first message by issuing a first read to read the first data from the first logical device. The first read may be sent from the second host to the second data storage system. The first logical device may be used exclusively in connection with sending messages from the first host to the second host. A second logical device may be used exclusively in connection with sending messages from the second host to the first host. The method may include: issuing a second message from the second host; and sending the second message from the second host to the first host. Sending the second message may include transmitting the second message indirectly to the first host over a second connection between the first data storage system and the second data storage system, wherein the second connection is used in connection with data replication to maintain a third device of the first data storage system and a fourth device of the second data storage system as synchronous mirrored copies of a second logical device. The second message may include second data sent from the second host to the first host. Sending the second message may include issuing a second write that writes the second data to a second logical address of the second logical device. The first host may receive the second message by issuing a second read to read the second data from the second logical device.

The second read may be sent from the first host to the first data storage system. The first logical device may have a logical address space and a first portion of the logical address space may be used exclusively in connection with sending messages from the first host to the second host, and a second portion of the logical address space may be used exclusively in connection with sending messages from the second host to the first host. The first write may be a first request to write the first data to a first logical address of the first portion. The method may include: issuing a second message from the second host; and sending the second message from the second host to the first host, wherein said sending the second message may include transmitting the second message indirectly to the first host over the first connection between the first data storage system and the second data storage system. The second message may include second data sent from the second host to the first host. Sending the second message may include issuing a second write that writes the second data to a second logical address of the first logical device. The second logical address may be included in the second portion. The first host may receive the second message by issuing a second read to read the second data from the second logical device. The second read may be sent from the first host to the first data storage system. There may be no direct communication connection between the first host and the second host. The first host may have a direct connection to the first data storage system and may not have a direct connection to the second data storage system. The second host may have a direct connection to the second data storage system and may not have a direct connection to the first data storage system. The first host and the second host may each include an instance of a distributed or clustered application. The first message may be issued by a first instance of the distributed or clustered application on the first host and the second message may be issued by a second instance of the distributed or clustered application on the second host. The first message and the second message may be issued in connection with any of coordinating access and control of storage resources used concurrently by the distributed or clustered application.

In accordance with another aspect of the techniques herein is a system comprising: a first host; a second host; a first data storage system; a second data storage system; and one or more memories comprising code stored thereon that, when executed, perform a method comprising: configuring a first device of the first data storage system and a second device of the second data storage system for synchronous replication, wherein the first device and the second device are configured as synchronous mirrored devices of a first logical device, wherein a first connection between the first data storage system and the second data storage system is used to transmit data, written to the first logical device, between the first data storage system and the second data storage system in order to maintain the first device and the second device as synchronous mirrored devices of the first logical device; configuring a third device of the first data storage system and a fourth device of the second data storage system for synchronous replication, wherein the third device and the fourth device are configured as synchronous mirrored devices of a second logical device, wherein a second connection between the first data storage system and the second data storage system is used to transmit data, written to the second logical device, between the first data storage system and the second data storage system in order to maintain the third device and the fourth device as synchronous mirrored devices of the second logical device; performing first processing in connection with a first write directed to the first logical device, wherein the first write is issued by the first host to the first data storage system, wherein the first write writes first data that is a first message to the second host, wherein said first processing includes sending the first data over the first connection to the second data storage system, wherein the first logical device is used exclusively in connection with sending messages from the first host to the second host; performing second processing in connection with a second write directed to the second logical device, wherein the second write is issued by the second host to the second data storage system, wherein the second write writes second data that is a second message to the first host, wherein said second processing includes sending the second data over the second connection to the second data storage system, wherein the second logical device is used exclusively in connection with sending messages from the second host to the first host. There may be no direct communication connection between the first host and the second host. The first host may have a direct connection to the first data storage system and may not have a direct connection to the second data storage system. The second host may have a direct connection to the second data storage system and may not have a direct connection to the first data storage system.

In accordance with another aspect of techniques herein is a computer readable medium comprising code stored thereon that, when executed, performs a method of performing inter-host communication comprising: issuing a first message from a first host; and sending the first message from the first host to a second host, wherein said sending includes: transmitting the first message indirectly to the second host over a first connection between a first data storage system and a second data storage system, wherein the first connection is used in connection with data replication to maintain a first device of the first data storage system and a second device of the second data storage system as synchronous mirrored copies of a first logical device.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
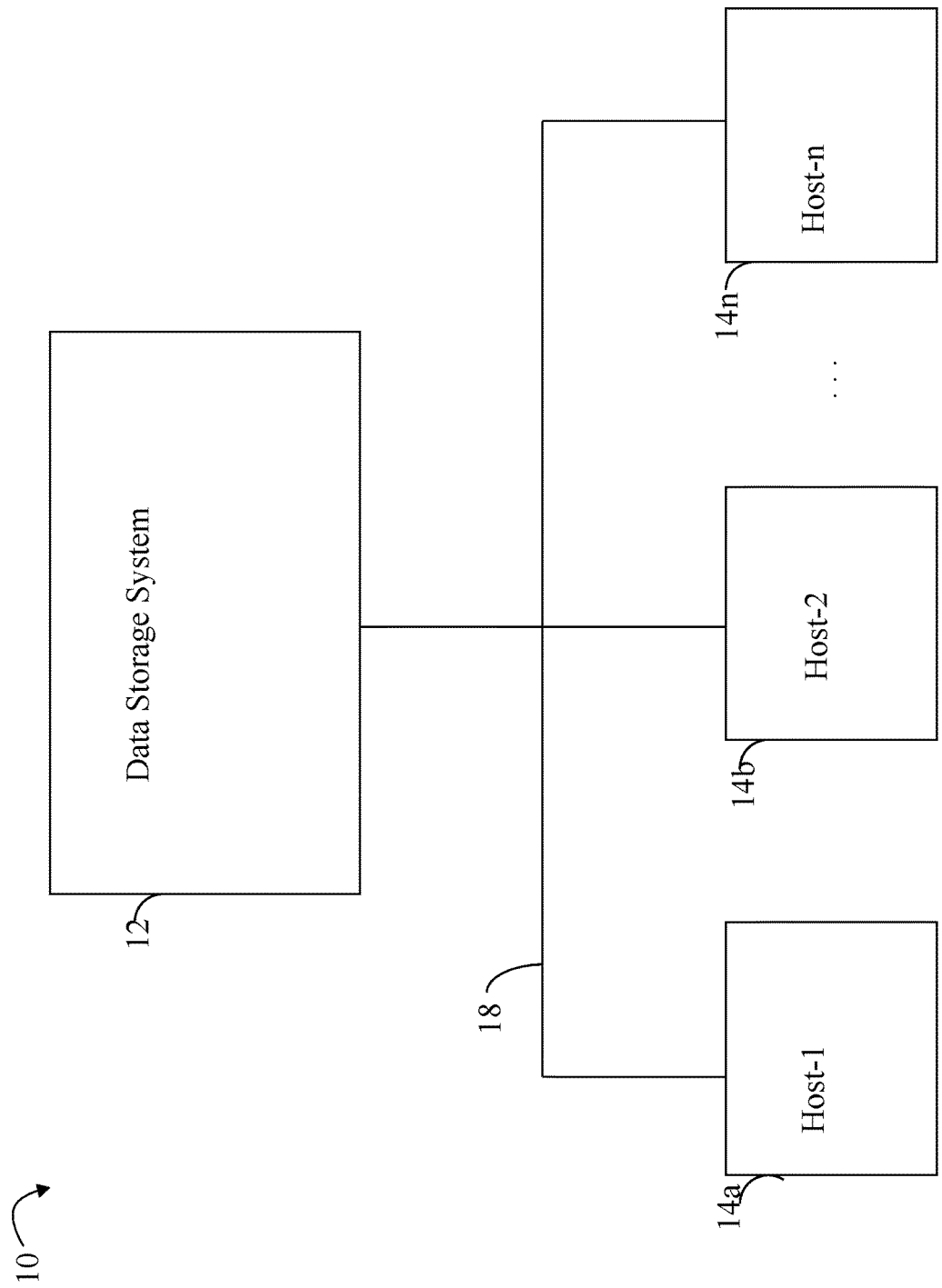
FIGS. 1, 3, 5, 6 and 7 are examples of embodiments of components that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, Infiniband (IB), and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as Dell's Symmetrix® VMAX® data storage system, as well one or more other data storage systems as may vary with the embodiment.

Figure 2A:
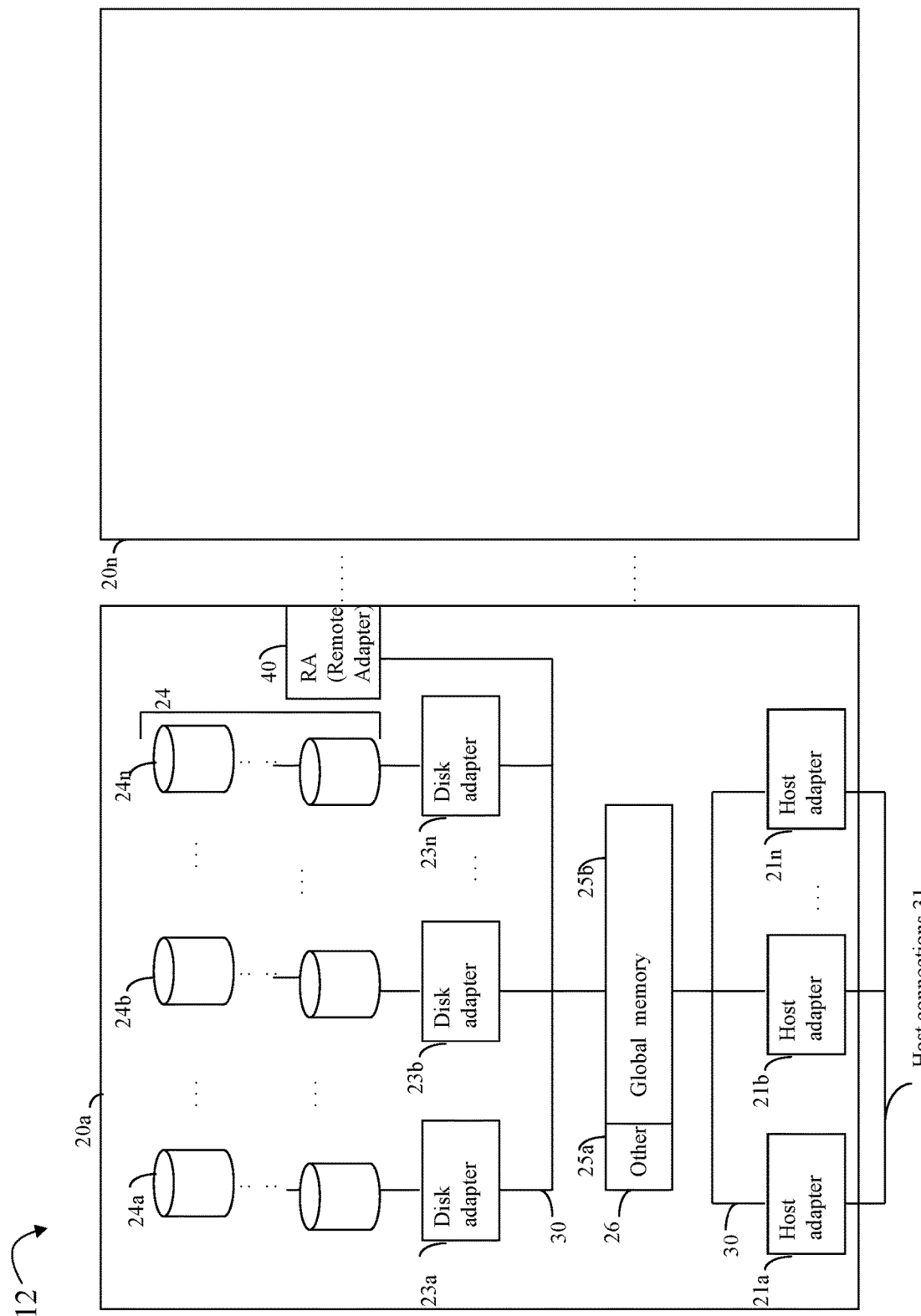
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the backend physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two data storage systems.

The system 20a may also include one or more host adapters ("HAs") or directors 21a-21n. Each of these HAs may be used to manage communications and data operations between one or more host systems and the global memory 25b. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by Dell Inc., various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate.

It should also be noted that a DA may also be a controller providing access to external physical drives or storage devices located on one or more external data storage systems rather than local physical drives located in the same physical storage system as the DA (such as illustrated in FIG. 2A).

Figure 2B:
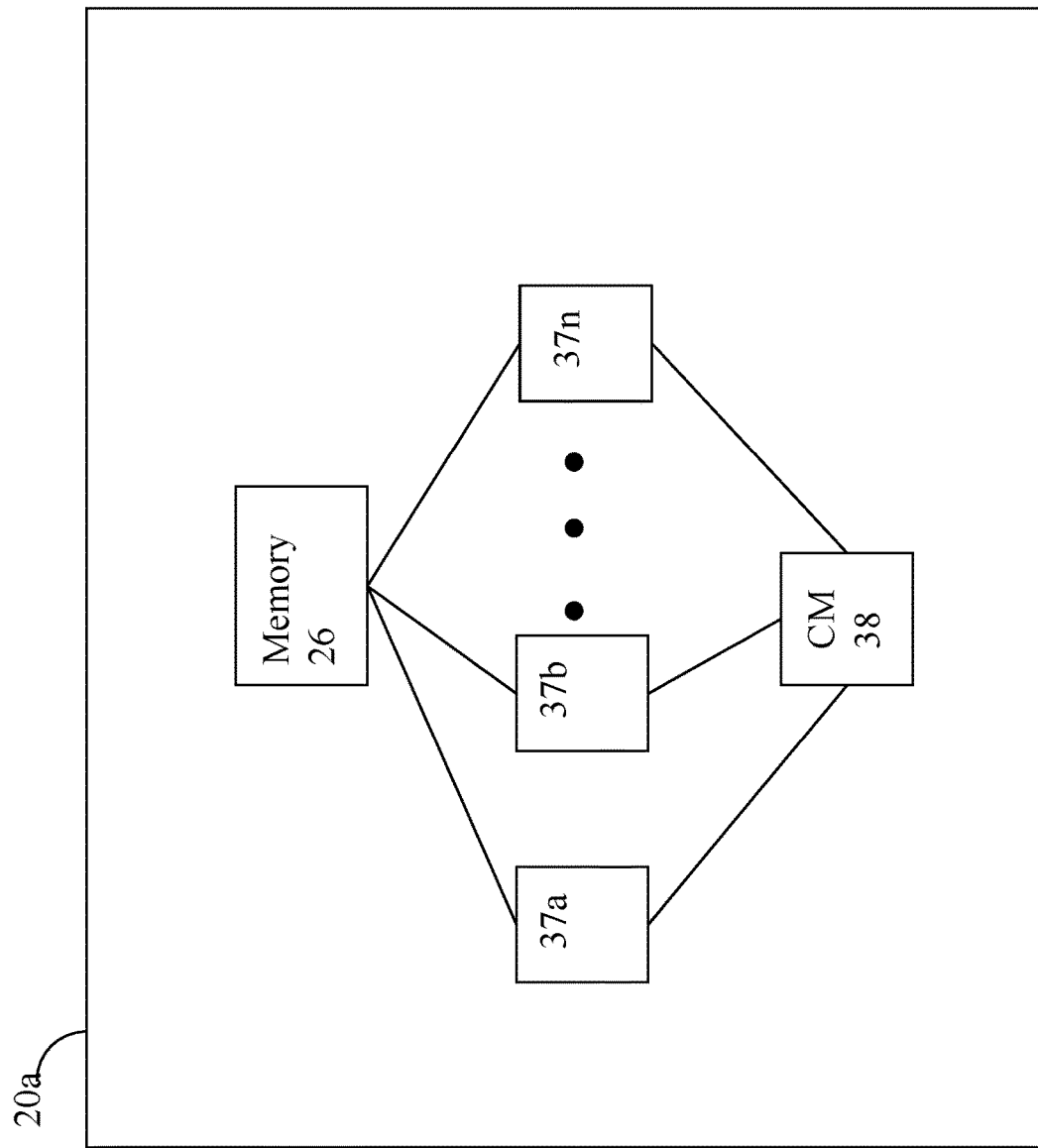
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

In at least one embodiment, a distributed or clustered application may execute on multiple hosts. For example, such a distributed application may be a distributed file system, distributed database, and the like. In such an embodiment, an instance of the distributed application may be executing on multiple hosts where the multiple hosts share one or more storage resources, such as one or more LUNs of the data storage system, storing data of the distributed application. For example, for a clustered application, such a LUN may be used as a quorum disk which, as known in the art, may be a shared block device with concurrent read/write access by all nodes in the cluster. In connection with the distributed or clustered application, the multiple hosts may communicate with one another such as in connection with coordination and sharing of the one or more storage resources among the multiple hosts. The communications between the multiple hosts may be used in connection with any needed mechanism or controls to generally facilitate sharing of the storage resources among the hosts for the distributed application, such as to maintain data coherency. The distributed application may be written for use between hosts that communicate using one or more particular supported communication protocols and associated connections. For example, the hosts executing the distributed application may communicate with one another over a network connection, such as the internet, using the Ethernet protocol. As known in the art, Ethernet is a widely installed local area network (LAN) technology. Ethernet is a link layer protocol in the TCP/IP stack, describing how networked devices can format data for transmission to other network devices on the same network segment, and how to put that data out on the network connection. The Ethernet protocol includes two units of transmission, packet and frame.

In some instances, there may be restrictions on the types of protocols and/or communication connection available from one or more hosts. For example, an Ethernet connection such as an internet connection may not be available to/from one or more of the hosts upon which it may be desired to execute the distributed application. Such restrictions regarding available connections and supported communication protocols on a host may be imposed for any reason. For example, in one aspect, use of an Ethernet connection and protocol may pose security issues and constraints whereby an Ethernet connection and protocol may not be sufficiently secure in some host environments. Thus, such hosts may not have an Ethernet connection. However, one or more other protocols and communication connections may be allowed and used in such secure host environments. For example, in at least one embodiment, a host may not support external communications over connections using the Ethernet protocol but may support and allow communications over connections using the Fibre Channel (FC) protocol. In one aspect, communications and connections using the FC protocol may be considered more secure relative to communications and connections using the Ethernet protocol.

More generally, for security reasons or other concerns, the hosts using the distributed or clustered application may require inter-host communication in accordance with a first protocol and associated connection (e.g., Ethernet protocol and Ethernet connection) whereby the first protocol and associated connection may not be available for inter-host communication on at least a first of the hosts. However, the first host, as well as the other remaining hosts, may provide for communication in accordance with a second protocol and associated connection (e.g., FC protocol and FC connection). As such, a technique such as described in following paragraphs may be used to facilitate communication between the hosts in accordance with the second protocol and associated connection rather than in accordance with the first protocol and associated connection. In particular, described in following paragraphs are techniques that may be used for secure communication and connectivity between hosts using the FC protocol and associated FC connection rather than the Ethernet protocol and associated Ethernet connection. In at least one embodiment, the inter-host communication technique described in following paragraphs may include use of an automated replication facility that uses the FC connection. Thus, the FC connection typically used by the automated replication facility may be leveraged or used for facilitating inter-host communications indirectly through data storage systems performing the automated replication via communications sent over the FC connection. In at least one embodiment, the replication facility may be a remote data facility as described in more detail below.

With reference back to FIG. 2A, illustrated is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix® or VMAX® data storage systems. The RA may be used with the Symmetrix® Remote Data Facility (SRDF®) products provided by Dell Inc. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) or a remote replication facility for use in an embodiment in connection with techniques herein.

Figure 3:
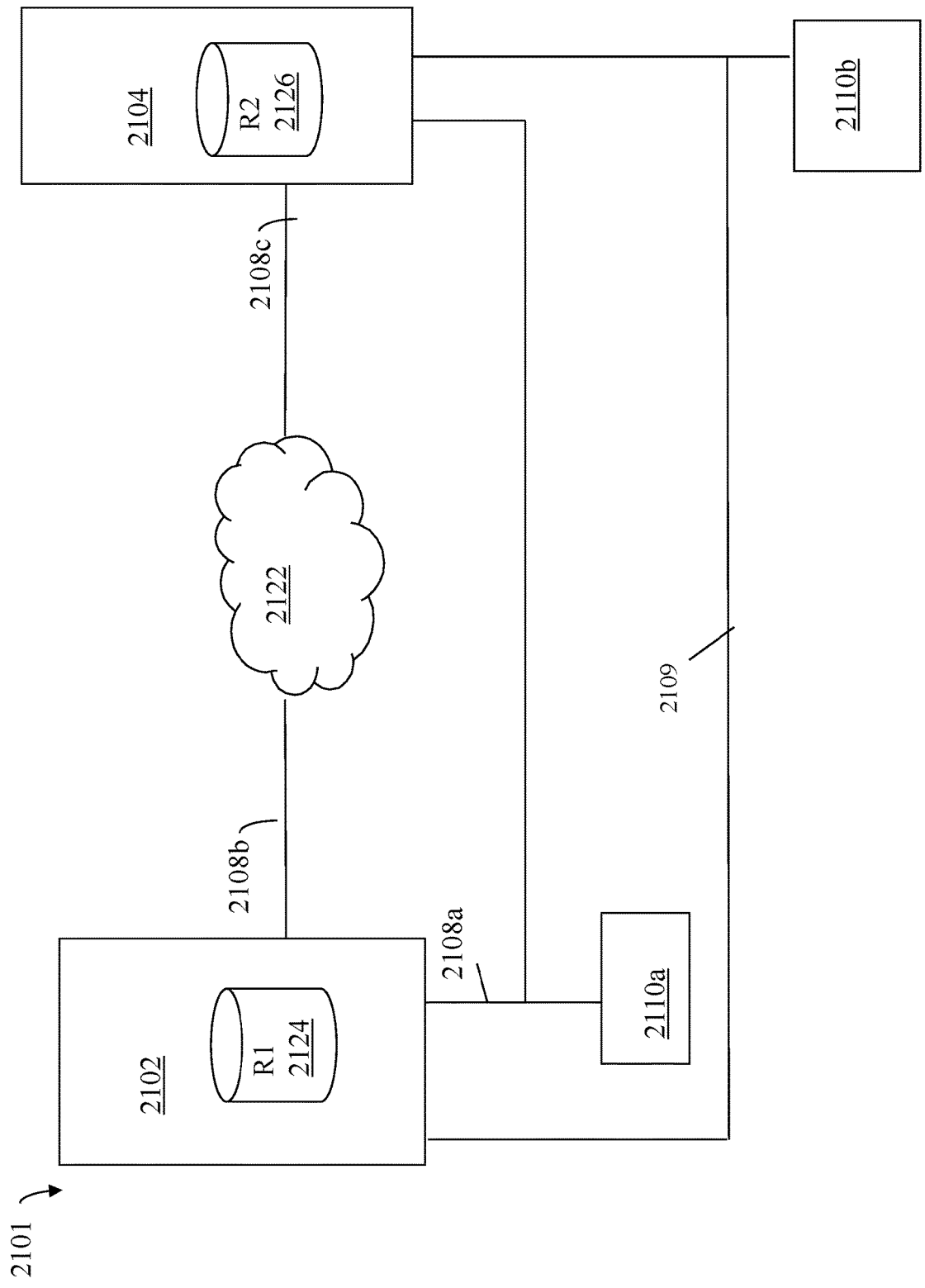

Referring to FIG. 3, shown is an example of an embodiment of a system 2101 that may be used in connection with the techniques described herein. It should be noted that the embodiment illustrated in FIG. 3 presents a simplified view of some of the components illustrated in FIG. 1, for example, including only some detail of the data storage systems 12 for the sake of illustration.

Included in the system 2101 are data storage systems 2102 and 2104, and hosts 2110a and 2110b. The data storage systems 2102, 2104 may be remotely connected and communicate over network 2122 (e.g., storage area network (SAN)). In at least one embodiment, the systems 2102, 2104 may communicate over 2108b, 2122, 2108c which may represent one or more FC connections over which communications may be transmitted in accordance with the FC protocol. Host 2110a may send I/O operations, more generally communications or requests, to data storage systems 2102 and 2104 over connection 2108a. Host 2110b may send I/O operations, more generally communications or requests, to data storage systems 2102 and 2104 over connection 2109. Connections 2108a and 2109 may be, for example, a network or other type of communication connection. The data storage system 2102 may be characterized as local with respect to host 2110a and the data storage system 2104 may be characterized as remote with respect to host 2110a. The data storage system 2104 may be characterized as local with respect to host 2110b, and the data storage system 2102 may be characterized as remote with respect to host 2110b.

The data storage systems 2102 and 2104 may include one or more data storage devices and other resources. In this example, data storage system 2102 includes logical storage device R1 2124 and data storage system 2104 includes logical storage device R2 2126. Both of the data storage systems may include one or more other logical and/or physical devices. From viewpoint of hosts 2110a and 2110b, R1 2124 and R2 2126 may logically configured as the same logical device, such as LUN A, whereby R1 2124 and R2 2126 may be maintained as logical mirrors of one another as described in more detail below in connection with automated replication.

The host 1210a may issue a command, such as to write data to device R1 of data storage system 2102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the SRDF® products provided by Dell Inc. Data storage device communication between Symmetrix® data storage systems using SRDF® is described, for example, in U.S. Pat. Nos. 5,742,792, 5,544,347, and 7,054,883, all of which are incorporated by reference herein. With SRDF®, a user may denote a first storage device, such as R1, as a master storage device and a second storage device, such as R2, as a slave storage device. Other incarnations of SRDF® may provide a peer to peer relationship between the R1 2124 and R2 2126 storage devices. In this example, the host 2110a interacts directly with the device R1 of data storage system 2102, but any data changes made are automatically provided to the R2 device of data storage system 2104 using SRDF®. In operation, the host 2110a may read and write data using the R1 volume in 2102, and SRDF® may handle the automatic copying and updating of data from R1 to R2 in data storage system 2104. In a similar manner, writes from host 2110b over connection 2109 to R1 2124 may also automatically be replicated to R2 2126.

As illustrated in connection with other figures herein, data storage system 2102 may have one or more RAs included therein to facilitate remote connections to the data storage system 2104. Communications between storage system 2102 and 2104 may be made over connections 2108b, 2108c to network 2122. Data storage system 2104 may include one or more RAs for use in receiving the communications from the data storage system 2102. The SRDF® replication functionality may be facilitated with the RAs provided at each of the data storage systems 2102 and 2104. In connection with SRDF®, a single RDF link or path may be between an RA of the system 2102 and an RA of the system 2104. As described in more detail below, techniques are described for use in transmitting data over an RDF link, such as I/O traffic including write data in connection with performing remote data replication over the RDF link between the systems 2102 and 2104.

An embodiment may also include the concept of a remote data facility (RDF) group in which one or more devices on a data storage system are associated with a particular group under the control of a single RA which services the devices included therein. Rather than have a single R1 device and a single R2 device, a grouping may be defined so that a source group of devices, such as on data storage system 2102, have corresponding target devices of a target group, such as devices on data storage system 2104. Devices in a source group may be mirrored in corresponding devices of a target group using SRDF® functionality.

SRDF®, or more generally any remote replication data facility, may operate in one or more different supported modes. For example, such modes may include SRDF® operating in synchronous mode, asynchronous mode, or adaptive copy mode. For example, in connection with SRDF®, the host may issue a write to an R1 device in a first data storage system and the data change is propagated to the R2 device in a second data storage system. As discussed in U.S. Pat. No. 5,544,347, SRDF® can be operated in either a synchronous mode or an asynchronous mode. When operating in the synchronous mode, the host does not consider an operation specified by a command chain to be completed until the command chain has been committed to both the first and second data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledgement from the second data storage system. With synchronous SRDF®, a host cannot proceed to the next I/O until a synchronous SRDF® I/O has completed.

Described in following paragraphs are techniques that may be used in connection with performing data replication in a synchronous manner such as SRDF® operating in an synchronous mode (SRDF®/S). With synchronous mode data replication, a host 2110a may issue a write to the R1 device 2124. The primary or R1 data storage system 2102 may store the write data in its cache at a cache location and mark the cache location as including write pending (WP) data. The remote data replication facility operating in synchronous mode, such as SRDF®/S, may propagate the write data across an established RDF link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110a that the write has been received and completed. Thus, generally, R1 device 2124 and R2 device 2126 may be logical devices, such as LUNs, configured as mirrors of one another. R1 and R2 devices may be, for example, fully provisioned LUNs, such as thick LUNs, or may be LUNs that are thin or virtually provisioned logical devices.

Figure 4:
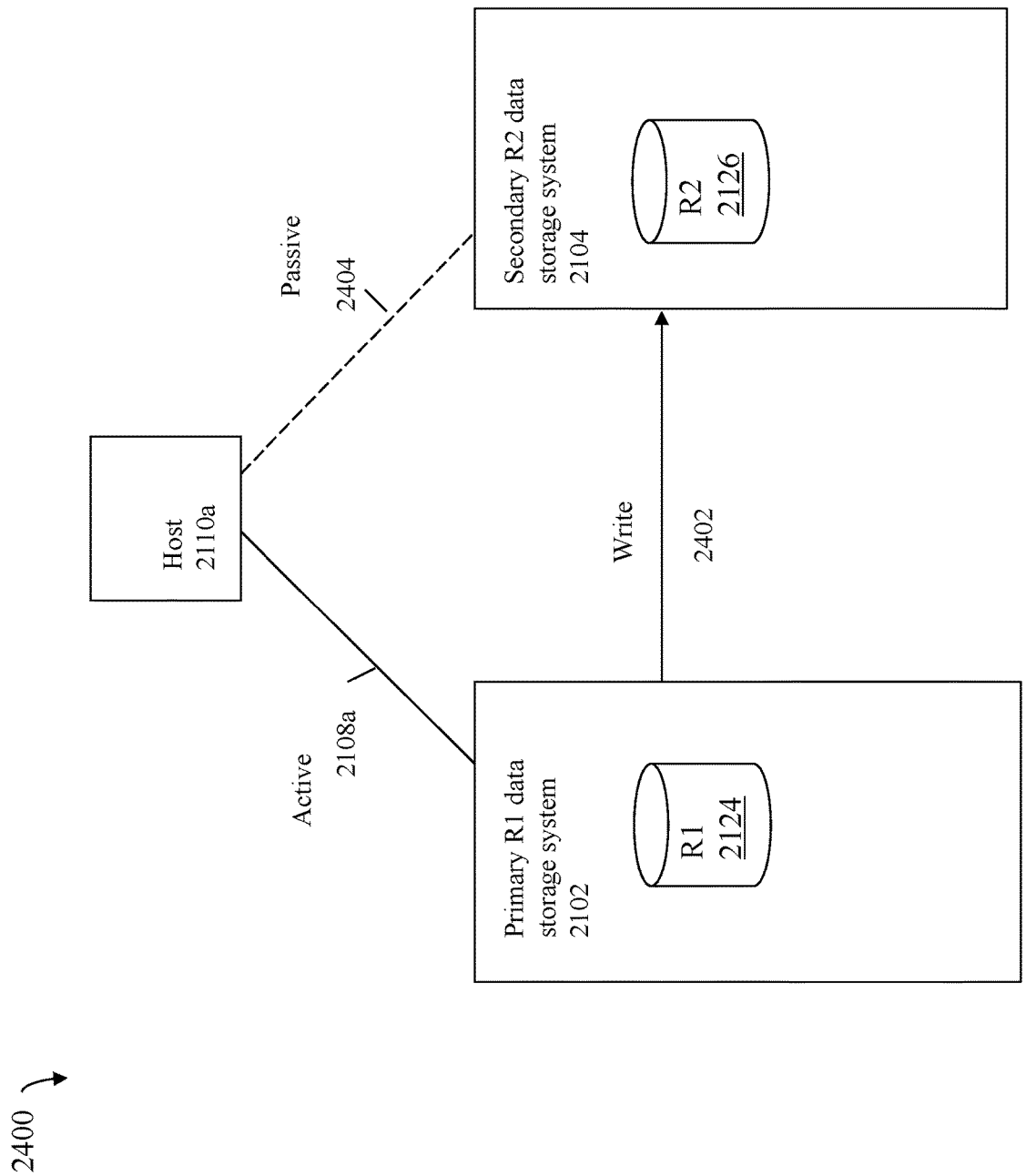
FIG. 4 is an example illustrating components in an active-passive configuration.

With reference to FIG. 4, shown is a further simplified illustration of components as described in connection with FIG. 3. It should be noted that element 2402 generally represents the replication link used in connection with sending write data from the primary R1 data storage system 2102 to the secondary R2 data storage system 2104. It should be noted that link 2402, more generally, may also be used in connection with other information and communications exchanged between 2102 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 may also be referred to herein as an active-passive configuration used with synchronous replication where the host 2110a has an active connection or path 2108a over which all I/Os are issued to only the R1 data storage system. The host 2110a may have a passive connection or path 2404 to the R2 data storage system 2104. In the configuration of 2400, the R1 device 2124 and R2 device 2126 may be configured and identified as the same LUN, such as LUN A, to the host 2110a. Thus, the host 2110a may view 2108a and 2404 as two paths to the same LUN A where path 2108a is active (over which I/Os may be issued to LUN A) and where path 2404 is passive (over which no I/Os to the LUN A may be issued). Should the connection 2108a and/or the R1 data storage system 2102 experience a failure or disaster whereby access to R1 2124 configured as LUN A is unavailable, processing may be performed on the host 2110a to modify the state of path 2404 to active and commence issuing I/Os to the R2 device configured as LUN A. In this manner, the R2 device 2126 configured as LUN A may be used as a backup accessible to the host 2110a for servicing I/Os upon failure of the R1 device 2124 configured as LUN A.

The active-passive configuration of FIG. 4 may be further modified to an active-active configuration in connection with synchronous replication described below in connection with FIG. 5. Such an active-active configuration in connection with synchronous replication as illustrated in FIG. 5 may be used in accordance with techniques herein.

Figure 5:
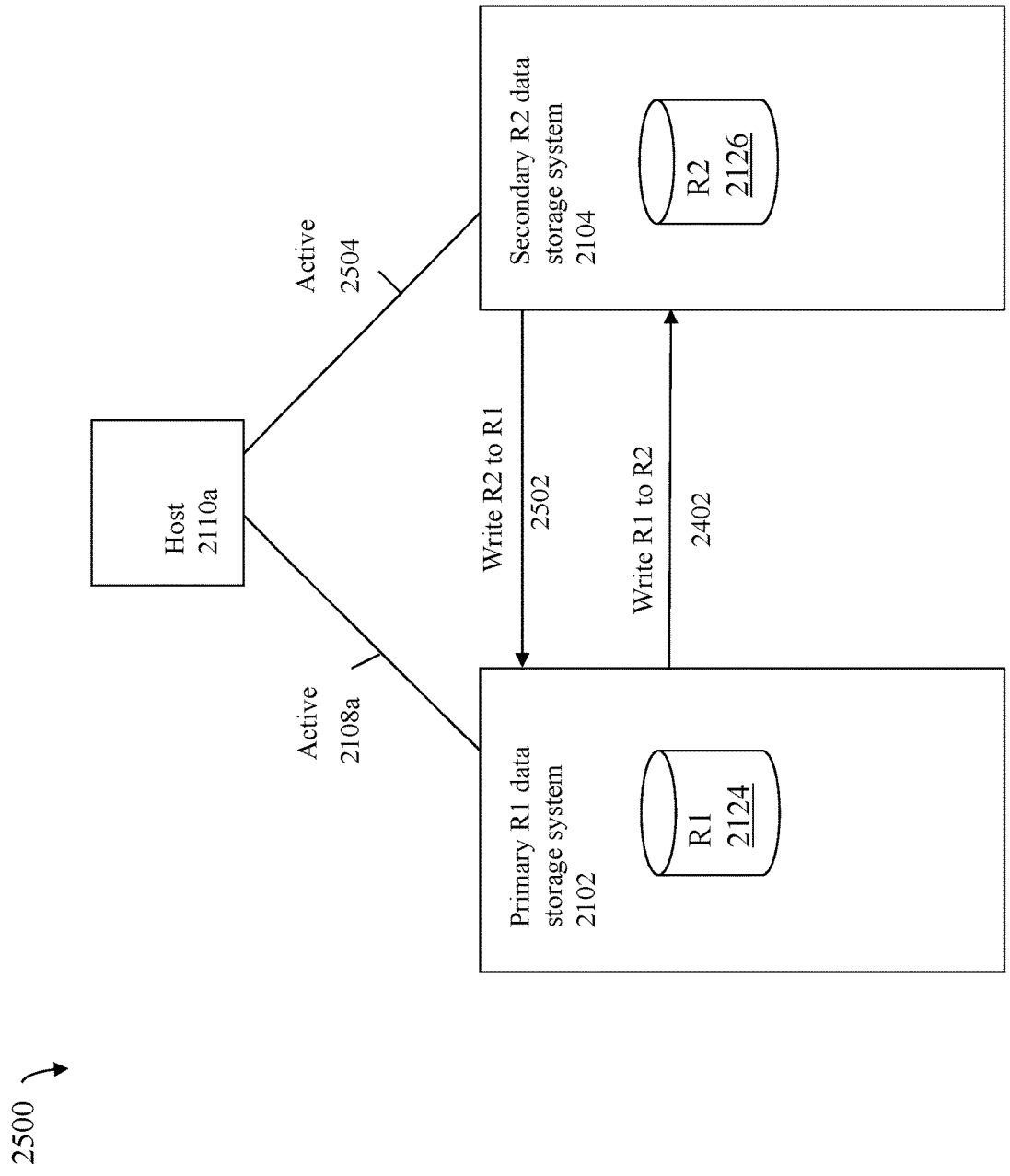

Referring to FIG. 5, shown is an example configuration of components that may be used in an embodiment in accordance with techniques herein. The example 2500 illustrates an active-active configuration in connection with synchronous replication. In an active-active configuration with synchronous replication, the host 2110a may have a first active path 2108a to the R1 data storage system and R1 device 2124 configured as LUN A. Additionally, the host 2110a may have a second active path 2504 to the R2 data storage system and R2 device 2126 configured as the same LUN A. From the view of the host 2110a, paths 2108a and 2504 appear as 2 paths to the same LUN A as described in connection with FIG. 4 with the difference that the host in the example 2500 configuration may issue I/Os, both reads and/or writes, over both of paths 2108a and 2504. The host 2110a may send a first write over path 2108a which is received by the R1 system 2102 and written to cache of the R1 system 2102 where, at a later point in time, the first write is destaged from the cache of the R1 system 2102 to physical storage (e.g., non-volatile backend storage) provisioned for the R1 device 2124 configured as LUN A. The R1 system 2102 also sends the first write to the R2 system 2104 over link 2402 where the first write is written to cache of the R2 system 2104, where, at a later point in time, the first write is destaged from the cache of the R2 system 2104 to physical storage provisioned for the R2 device 2126 configured as LUN A. Once the first write is written to the cache of the R2 system 2104, the R2 system 2104 sends an acknowledgement over link 2402 to the R1 system 2102 that it has completed the first write. The R1 system 2102 then returns an acknowledgement to host 2110a over path 2108a that the first write has completed.

The host 2110a may also send a second write over path 2504 which is received by the R2 system 2104 and written to cache of the R2 system 2104 where, at a later point in time, the second write is destaged from the cache of the R2 system 2104 to physical storage provisioned for the R2 device 2126 configured as LUN A. The R2 system 2104 also sends the second write to the R1 system 2102 over a second link 2502 where the second write is written to cache of the R1 system 2102, and where, at a later point in time, the second write is destaged from the cache of the R1 system 2102 to physical storage provisioned for the R1 device 2124 configured as LUN A. Once the second write is written to the cache of the R1 system 2102, the R1 system 2102 sends an acknowledgement over link 2502 to the R2 system 2104 that it has completed the second write. The R2 system 2104 then returns an acknowledgement to host 2110a over path 2504 that the second write has completed.

Effectively, the active-active configuration used with synchronous replication as in FIG. 5 has the R2 system 2104 acts as another primary data storage system which facilitates propagation of writes received at the data storage system 2104 to the data storage system 2102. It should be noted that although FIG. 5 illustrates for simplicity a single host accessing both the R1 device 2124 and R2 device 2126, any number of hosts may access one or both of the R1 device 2124 and the R2 device 2126.

Also, although only a single R1-R2 pair configured as LUN A has been described, more generally, multiple LUNs may be configured whereby each such LUN is configured as a different R1-R2 pair, respectively, on data storage systems 2102 and 2104.

With reference back to FIG. 3, it should be noted that hosts 2110a and 2110b may not have a direct communication connection therebetween. Thus, hosts 2110a-b may not be able to directly communicate with one another such as over the internet or other Ethernet connection.

However, as will be described in more detail below, an embodiment in accordance with techniques herein may leverage the remote data facility/remote replication facility infrastructure and communication connections (e.g., RDF links or connections 2402, 2502 of FIG. 5) to facilitate indirect communications between hosts 2210a and 2110b. Furthermore, in the embodiments described below such as in connection with FIGS. 6 and 7, the host 2110a may have a direct communication connection to the data storage system 2102 (that is local with respect to host 2110a) but not a direct connection to data storage 2104 (that is remote with respect to 2110a). Similarly in FIGS. 6 and 7, the host 2110b may have a direct communication connection to the data storage system 2104 (that is local with respect to host 2110b) but not a direct connection to data storage 2102 (that is remote with respect to 2110b).

Figure 6:
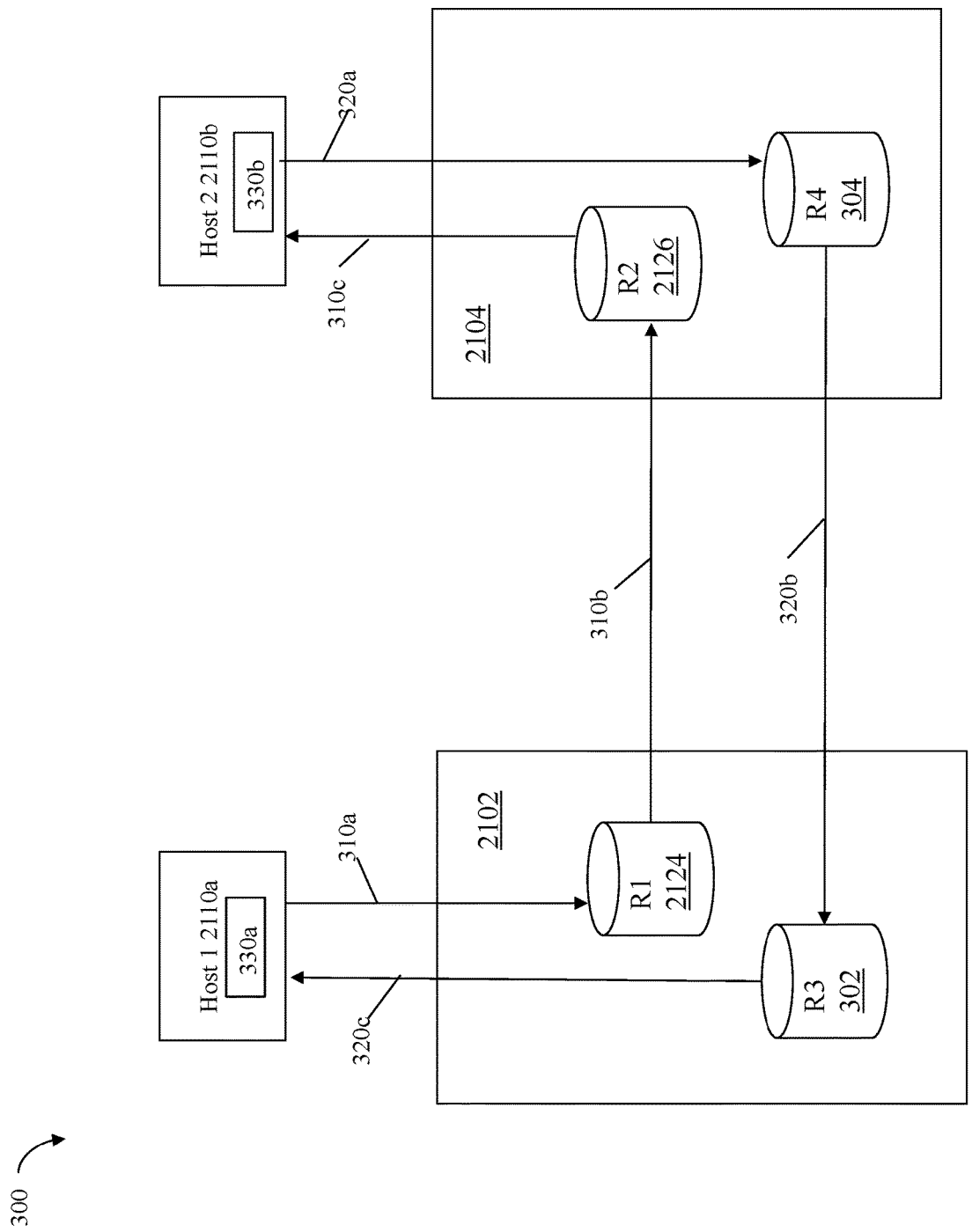

Referring to FIG. 6, shown is an example of components that may be used in an embodiment in accordance with techniques herein. The example 300 includes hosts 2110a-b, data storage systems 2102 and 2104, and R1 2124 and R2 2126 as described above. In the example 300, R1 2124 and R2 2126 may be configured as logical device mirrors for the same LUN, LUN A. As described above, R1 2124 and R2 2126 may be configured as logical device mirrors for the same LUN, LUN A, in an active-active configuration for synchronous remote replication. LUN A may be visible and accessible for I/Os from both hosts 2110a and 2110b. In a manner similar to that as described for LUN A, a second LUN B may be configured using devices R3 302 and R4 304 whereby R3 302 and R4 304 are configured as logical device mirrors in an active-active configuration for synchronous remote replication. Thus, R3 302 and R4 304 may operate and be configured in a manner as described in connection with FIG. 5 regarding devices R1 2124 and R2 2126. LUN B may be visible and accessible for I/Os from both hosts 2110a and 2110b.

Elements 330a-b may denote instances of a distributed or clustered application, such as a distributed file system, distributed database, and the like, whereby hosts 2110a-b need to communicate with one another in order to facilitate synchronization and sharing of other storage resources, such as other logical devices, storing data for the distributed application 330a-b.

In accordance with techniques herein and with reference to FIG. 6, the two pairs of RDF configured devices (e.g., 2124, 2126 for LUN A; 302, 304 for LUN B) for LUN A and LUN B may be included in two uni-directional data flow links over RDF connections to facilitate indirect communications between hosts 2110a-b. In this example elements 310b and 320b may denote links or connections used by the remote replication facility that automatically replicate writes to LUN A and LUN B, where such writes may be received at data storage systems 2102 and 2104, in a manner as described above in connection with FIG. 5. In at least one embodiment, links or connection 310*b*, 320*b* may be two separate FC connections. Elements 310*a*, 320*c* may denote communications between the host 2110*a* and data storage system 2102 also sent over one or more FC connections between 2110*a* and 2102. Elements 310*c*, 320*a* may denote communications between the host 2110*b* and data storage system 2104 also sent over one or more FC connections between 2110*b* and 2104. In such an embodiment, each pair of devices (e.g., the R1-R2 pair 2124, 2126 configured as mirrors for LUN A; and the R3-R4 pair 302, 304 configured as mirrors for LUN B) may be included in a different uni-directional link or flow path as will now be described.

A first uni-directional link or flow path may be formed from 310*a*, 310*b* and 310*c* utilizing the R1-R2 pair 2124, 2126 configured as mirrors for LUN A. In operation, host 1 2110*a* issues a write to LUN A where the write is received at data storage system 2102 and where the write is sent over connection 310*a*. The write data is written to R1 2124 on data storage system 2102. The remote replication facility automatically sends the write data from the data storage system 2102, to the other remote data storage system 2104, over the replication link or connection 310*b*. The write data is written to the cache on system 2104 whereby the data is destaged at a later point in time to physical storage provisioned for R2 2126. The system 2104 returns an acknowledgment (over connection 310*b*) regarding completion of the write by the system 2104 once the write data has been stored in the cache of system 2104. The system 2102 receives the acknowledgement from system 2104. The system 2102 returns an acknowledgment (over 310*a*) to the host 2110*a* regarding completion of the write. The host 2 2110*b* may then read the write data written to R2 2126 over connection 310*c*. Thus, the first uni-directional flow illustrated by 310*a*, 310*b*, and 310*c*, described above denotes the path where host 1 2110*a* writes to LUN A and host 2 2110*b* reads from LUN A. In this manner, host 1 2110*a* may send communications to host 2 2110*b* using the configured R1-R2 device pair configured for LUN A. The communications sent by host 2110*a* to host 2110*b* may be the data written to LUN A by host 2110*a* as described above whereby the remote replication facility and FC connection 310*b* used for replication may be used to send the communications (in the form of write data written to LUN A/R1 2124) to the data storage system 2104 (e.g., R2 2126). The write data written by host 2110*a* (now written to R2 2126/LUN A) may then be obtained by host 2 2110*b* over connection 310*c* by issuing a read operation to system 2104 to read the data from LUN A. For example, the host 2110*a* may issue a write to system 2102 that writes first data to a first logical address on LUN A (e.g., the first data is stored on R1 2124 configured as a mirror of LUN A where the first data is sent from 2102 to 2104 over connection 310*b* as described above). Host 2, 2110*b* may issue a read to system 2104 that reads the first data from the logical address on LUN A (e.g., the first data is stored on R2 2126 configured as a mirror of LUN A). The first write data may be a communication issued by host 1 2110*a* in connection with inter-host messaging between hosts 2110*a-b* needed for coordination and control of other storage resources used by the distributed application instances 330*a-b*.

A second uni-directional link or flow path may be formed from 320*a*, 320*b* and 320*c* utilizing the R3-R4 pair 302, 304 configured as mirrors for LUN B. In operation, host 2 2110*b* issues a write to LUN B where the write is received at data storage system 2104 and where the write is sent over connection 320*a*. The write data is written to R4 304 on data storage system 2104. The remote replication facility automatically sends the write data from the data storage system 2104, to the other remote data storage system 2102, over the replication link or connection 320*b*. The write data is written to the cache on system 2102 whereby the data is destaged at a later point in time to physical storage provisioned for R3 302. The system 2102 returns an acknowledgment (over connection 320*b*) regarding completion of the write by the system 2102 once the write data has been stored in the cache of system 2102. The system 2104 receives the acknowledgement from system 2102. The system 2104 returns an acknowledgment (over 320*a*) to the host 2110*b* regarding completion of the write. The host 1 2110*a* may then read the write data written to R3 302 over connection 320*c*. Thus, the second uni-directional flow illustrated by 320*a*, 320*b*, and 320*c*, described above denotes the path where host 2 2110*b* writes to LUN B and host 1 2110*a* reads from LUN B. In this manner, host 2 2110*b* may send communications to host 1 2110*a* using the configured R3-R4 device pair configured for LUN B. The communications sent by host 2110*b* to host 2110*a* may be the data written to LUN B by host 2110*b* as described above whereby the remote replication facility and FC connection 320*b* used for replication may be used to send the communications (in the form of write data written to LUN B/R4 304) to the data storage system 2102 (e.g., R3 302). The write data written by host 2110*b* (now written to R3 302/LUN B) may then be obtained by host 1 2110*a* over connection 320*c* by issuing a read operation to system 2102 to read the data from LUN B. For example, the host 2110*b* may issue a write to system 2104 that writes second data to a first logical address on LUN B (e.g., the second data is stored on R4 304 configured as a mirror of LUN B where the second data is sent from 2104 to 2102 over connection 320*b* as described above). Host 1, 2110*a* may issue a read to system 2102 to read the second data from the logical address on LUN B (e.g., the second data is stored on R3 302 configured as a mirror of LUN B). The second write data may be a communication issued by host 2 2110*b* in connection with inter-host messaging between hosts 2110*a-b* needed for coordination and control of other storage resources used by the distributed application instances 330*a-b*.

In connection with the foregoing described and illustrated in FIG. 6, the distributed or clustered application instances 330*a-b* on hosts 2110*a-b* may communicate with each other indirectly over a FC connection between data storage system 2102, 2104. Such communications may be in the form of write data to two LUNs A and B each having a configured pair of logical devices (e.g., R1-R2 pair; R3-R4 pair) which are automatically maintained as mirrors by a replication facility in a synchronous active-active configuration. LUN A and its configured R1-R2 pair may be used exclusively for host 1 2110*a* sending/writing communications that are received/read by host 2 2110*b*, and LUN B and its configured R3-R4 pair may be used exclusively for host 2 2110*b* sending/writing communications that are received/read by host 1 2110*a*. Thus, hosts 2110*a-b* may communicate using FC connections 310*b*, 320*b* rather than other connections, such as rather than using one or more Ethernet connections directly connecting hosts 2110*a-b*. Replacing Ethernet connections with more secure FC communication connections may be characterized in one aspect as forming a secure WAN (wide area network) allowing the distributed or clustered application instances 330*a-b* to execute and communicate in a secure manner between hosts 2110*a-b*. Consistent with discussion above in at least one embodiment, the secured communications sent over the FC connections may be implemented, for example, by embedding IP packets (typically sent over an Ethernet connection) in an FC frame. For example, host 1 2110*a* may send an IP packet embedded in an FC frame over connection 310*a* whereby the FC frame and IP packet includes write data written to LUN A, R1 2124, and where the write data is a message or communication from host 2110*a* to host 2110*b* (e.g., such as a message from 330*a* to 330*b*). Such techniques then include writing the write data to R1 2124 and relying on the replication facility to automatically send the write data to the other remote data storage system 2104 where the write data may then be read by host 2 2110*b*. In this manner, the replication links 310*b*, 320*b* may be used to tunnel I/O traffic or messages between the application instances 330*a-b* and respective hosts 2110*a-b*.

In an embodiment using the configuration illustrated in FIG. 6, a first host writing to a LUN, such as host 1 2110*a* writing to LUN A, writes to a particular logical address or location on LUN A. The second host reading from the LUN, such as host 2 2110*b* reading from LUN A, may know the particular logical address or location being written to by the other first host. For example, in one case, there may be a predetermined understanding between hosts 2110*a-b* that each message sent from 2110*a* to 2110*b* may be a particular size and thus each message may be written at a logical address having a particular offset. For example, each new message may be written to the next logical address location or offset in a predetermined sequence. For example, each message sent from 2110*a* to 2110*b* may be written at the next logical block in increments of 1 (e.g., first message written at LUN A, logical offset 0, second message written at LUN A, offset 1, and the like). In a similar manner, communications may be sent from host 2 2110*b* to host 1 2110*a* using LUN B. More generally, an embodiment may use any suitable technique for notifying or informing the receiving second host (e.g., host 2 2110*b*) reading from a LUN (e.g., LUN A) that the other sending host (e.g., host 2110*a*) has written a new communication to the LUN.

The example 300 illustrates a first embodiment in accordance with techniques herein with two LUNs A and B and thus two pairs of configured mirrored device pairs (e.g., R1 2124, R2 2126 for LUN A; and R3 302 and R4 304 for LUN B) in a synchronous active-active configuration. What will be described with reference to FIG. 7 is another example of an embodiment in accordance with techniques herein using a single pair of configured mirrored devices in a synchronous active-active configuration.

Figure 7:
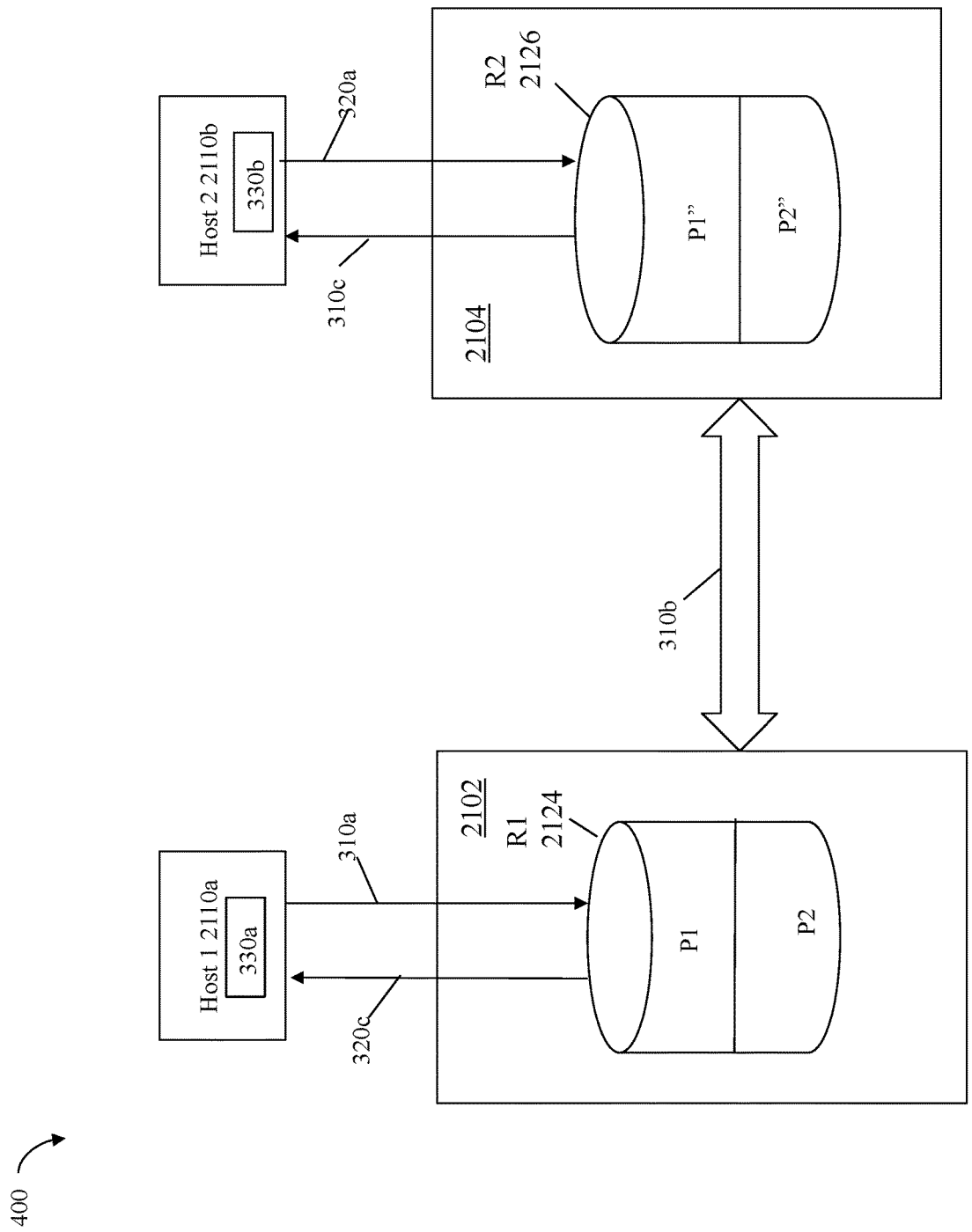

Referring to FIG. 7, shown is another example 400 of components that may be used in an embodiment in accordance with techniques herein. The example 400 includes hosts 2110*a-b*, data storage systems 2102 and 2104, and R1 2124 and R2 2126 as described above. In the example 400, R1 2124 and R2 2126 may be configured as logical device mirrors for the same LUN, LUN A. As described above, R1 2124 and R2 2126 may be configured as logical device mirrors for the same LUN, LUN A, in an active-active configuration for synchronous remote replication. LUN A may be visible and accessible for I/Os from both hosts 2110*a* and 2110*b*. Element 310*b* may denote the RDF connection or link as described above with the difference in this example 400 that the connection 310*b* may be used for sending write data in connection with data written to LUN A by host 1 2110*a*, and also used for sending write data in connection with data written to LUN A by host 2 2110*b*, as described below in more detail.

Elements 330*a-b* may denote instances of a distributed or clustered application, such as a distributed file system, distributed database, and the like, whereby hosts 2110*a-b* need to communicate with one another in order to facilitate synchronization and sharing of other storage resources, such as other logical devices, storing data for the distributed application 330*a-b*.

In accordance with techniques herein and with reference to FIG. 7, the single pair of RDF configured devices (e.g., 2124, 2126) for LUN A may be used in bi-directional data flow over connection 310*b* to facilitate indirect communications between hosts 2110*a-b*. In this example elements 310*b* may denote a link or connection used by the remote replication facility that automatically replicate writes to LUN A, where such writes may be received at data storage systems 2102 and 2104, in a manner as described above in connection with FIG. 5. Link or connection 310*b* may be an FC connection. Elements 310*a*, 320*c* may denote communications between the host 2110*a* and data storage system 2102 also sent over one or more FC connections between 2110*a* and 2102. Elements 310*c*, 320*a* may denote communications between the host 2110*b* and data storage system 2104 also sent over one or more FC connections between 2110*b* and 2104. In such an embodiment with the pair of devices R1-R2 2124, 2126 configured as mirrors for LUN A, a first set or predetermined portion of LUN A may be used for communications of a first data flow or path for data written by host 1 2110*a* that is then read by host 2 2110*b*, and a second set of predetermined portion of LUN A may be used for communications of a second data flow or path for data written by host 2 2110*b* that is then read by host 1 2110*a*. P1 and P1" may denote the foregoing first portion or predetermined logical address range portion of LUN A, where P1 and P1" may be maintained as mirrored portions of LUN A on the configured R1-R2 device pair. P2 and P2" may denote the foregoing second portion or predetermined logical address range portion of LUN A, where P2 and P2" may be maintained as mirrored portions of LUN A on the configured R1-R2 device pair. P1 and P1" may denote the same set of logical addresses of LUN A. P2 and P2" may denote the same set of logical addresses of LUN A. For example, in at least one embodiment, the logical address range of LUN A may be partitioned in two whereby a first portion of the logical address range of LUN A is denoted by P1 and P1", and whereby a second portion of the logical address range of LUN A is denoted by P2 and P2". The logical address portions associated with P1/P1" and P2/P2" may each be a single contiguous or consecutive range of logical addresses. As a variation, and more generally, P1/P1" and P2/P2" may each also include multiple non-consecutive or non-contiguous addresses. For example, P1/P1" may include logical address subranges S1, S2, S3, . . . Sn, where each of S1 through Sn may individually represent a consecutive range of logical addresses; however, the different subranges be not be consecutive or contiguous with respect to other subranges of P1/P1". (e.g., S1 not contiguous or consecutive with respect to S2, and so on). Similarly, P2/P2" may include logical address subranges S1, S2, S3, . . . Sm, where each of S1 through Sm may individually represent a consecutive range of logical addresses; however, the different subranges be not be consecutive or contiguous with respect to other subranges of P2/P2". (e.g., S1 not contiguous or consecutive with respect to S2, and so on). In at least one embodiment, the particular portions of the logical address range of P1/P1" of LUN A written to by host 1 2110*a* and of P2/P2" of LUN A written to by host 2 2110*b* may be predetermined (e.g., P1/P1" is the first half, 0-N, inclusively, of LUN's logical address range (0-M, inclusively), and P2/P2" is the second half, N+1-M, of LUN A's logical address range). As a variation, both hosts 2110a-b may each write messages of a predetermined size at a next logical address location. In this latter case, the logical address range portions P1/P1" and P2/P2" written to by the hosts 2110a-b may not be contiguous or consecutive (e.g., P1/P1" logical addresses may not all be consecutive and P2/P2" logical addresses may not all be consecutive). Rather, for example, each of the hosts 2110a-b may write to the next logical address in the logical address range of LUN A (e.g., host 1 2110a writes message 1 to address or location 1; host 2, 2110b write message 2 to address or location 2; host 2, 2110b write message 3 to address or location 1; and so on as needed for messages exchanged between the hosts 2110a-b).

A first uni-directional link or flow path may be formed from 310a, 310b and 310c utilizing the R1-R2 pair 2124, 2126 configured as mirrors for LUN A. In operation, host 1 2110a issues a write to P1 of R1 2124 of LUN A where the write is received at data storage system 2102 and where the write is sent over connection 310a. The write data is written to R1 2124 on data storage system 2102. The remote replication facility automatically sends the write data from the data storage system 2102, to the other remote data storage system 2104, over the replication link or connection 310b. The write data is written to the cache on system 2104 whereby the data is destaged at a later point in time to physical storage provisioned for R2 2126. The system 2104 returns an acknowledgment (over connection 310b) regarding completion of the write by the system 2104 once the write data has been stored in the cache of system 2104. The system 2102 receives the acknowledgement from system 2104. The system 2102 returns an acknowledgment (over 310a) to the host 2110a regarding completion of the write. The host 2 2110b may then read the write data written to R2 2126 over connection 310c. Thus, the first uni-directional flow illustrated by 310a, 310b, and 310c, described above denotes the path where host 1 2110a writes to P1 of LUN A and host 2 2110b reads from P1" of LUN A. In this manner, host 1 2110a may send communications to host 2 2110b using a particular portion P1 of the configured R1-R2 device pair configured for LUN A. The communications sent by host 2110a to host 2110b may be the data written to P1 of LUN A by host 2110a as described above whereby the remote replication facility and FC connection 310b used for replication may be used to send the communications (in the form of write data written to LUN A/R1 2124) to the data storage system 2104 (e.g., R2 2126). The write data written to P1 by host 2110a (now written or mirrored to P1" of R2 2126/LUN A) may then be obtained by host 2 2110b over connection 310c by issuing a read operation to system 2104 to read the data from LUN A. For example, the host 2110a may issue a write to system 2102 that writes first data to a first logical address of P1 on LUN A (e.g., the first data is stored on P1 of R1 2124 configured as a mirror of P1" of LUN A where the first data is sent from 2102 to 2104 over connection 310b as described above). Host 2, 2110b may issue a read to system 2104 that reads the first data from the logical address of P1" on LUN A (e.g., the first data is stored on P1" of R2 2126 configured as a mirror of LUN A). The first write data may be a communication issued by host 1 2110a in connection with inter-host messaging between hosts 2110a-b needed for coordination and control of other storage resources used by the distributed application instances 330a-b.

A second uni-directional link or flow path may be formed from 320a, 310b and 320c utilizing the R1-R2 pair 2124 2126 configured as mirrors for LUN A. In operation, host 2 2110b issues a write to P2" of R2 2126 of LUN A where the write is received at data storage system 2104 and where the write is sent over connection 320a. The write data is written to P2" of R2 2126 on data storage system 2104. The remote replication facility automatically sends the write data from the data storage system 2104, to the other remote data storage system 2102, over the replication link or connection 310b. The write data is written to the cache on system 2102 whereby the data is destaged at a later point in time to physical storage provisioned for P2 of R1 2124. The system 2102 returns an acknowledgment (over connection 310b) regarding completion of the write by the system 2102 once the write data has been stored in the cache of system 2102. The system 2104 receives the acknowledgement from system 2102. The system 2104 returns an acknowledgment (over 320a) to the host 2110b regarding completion of the write. The host 1 2110a may then read the write data written to P2 of R1 2124 over connection 320c. Thus, the second uni-directional flow illustrated by 320a, 310b, and 320c, described above denotes the path where host 2 2110b writes to P2" of R2 2126 of LUN A and host 1 2110a reads from P2 of R1 2124 of LUN A. In this manner, host 2 2110b may send communications to host 1 2110a using the configured R1-R2 device pair configured for LUN A. The communications sent by host 2110b to host 2110a may be the data written to P2" of LUN A by host 2110b as described above whereby the remote replication facility and FC connection 310b used for replication may be used to send the communications (in the form of write data written to P2" of LUN A/R2 2126) to the data storage system 2102 (e.g., P2 of R1 2124). The write data written by host 2110b (now written to P2 of R1 2124/LUN A) may then be obtained by host 1 2110a over connection 320c by issuing a read operation to system 2102 to read the data from LUN A. For example, the host 2110b may issue a write to system 2104 that writes second data to a first logical address on LUN A (e.g., the second data is stored on P2" of R2 2126 configured as a mirror of LUN A where the second data is sent from 2104 to 2102 over connection 320b as described above). Host 1, 2110a may issue a read to system 2102 to read the second data from the logical address on LUN A (e.g., the second data is stored on P2 of R1 2124 configured as a mirror of LUN A). The second write data may be a communication issued by host 2 2110b in connection with inter-host messaging between hosts 2110a-b needed for coordination and control of other storage resources used by the distributed application instances 330a-b.

In connection with the foregoing described and illustrated in FIG. 7, the distributed or clustered application instances 330a-b on hosts 2110a-b may communicate with each other indirectly over a FC connection between data storage system 2102, 2104. Such communications may be in the form of write data to a single LUN having a configured pair of logical devices (e.g., R1-R2 pair) which are automatically maintained as mirrors by a replication facility in a synchronous active-active configuration. Thus, hosts 2110a-b may communicate using FC connection 310b rather than other connections, such as rather than using one or more Ethernet connections directly connecting hosts 2110a-b. Consistent with discussion above and in a manner similar to that as described in connection with FIG. 6, the secured communications sent over the FC connections may be implemented, for example, by embedding IP packets (typically sent over an Ethernet connection) in an FC frame.

What will now be described in connection with following figures are flowcharts of processing steps that may be performed in an embodiment in accordance with techniques herein. The flowcharts summarize processing described above.

Figure 8:
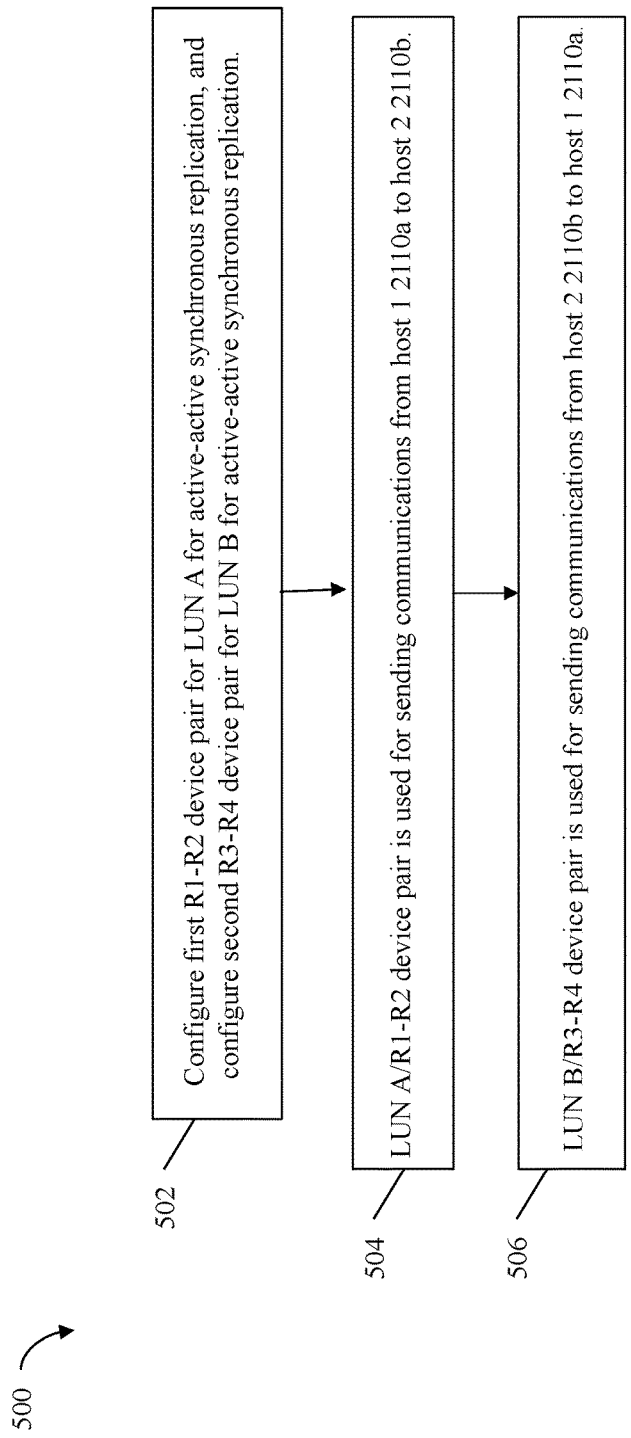
FIGS. 8, 9, 10 and 11 are flowcharts of processing steps that may be performed in an embodiment in accordance with techniques herein.

Referring to FIG. 8, shown is a first flowchart 500 of processing steps that may be performed in an embodiment in accordance with techniques herein such as described in connection with FIG. 6 using two pairs of devices configured for active-active synchronous replication. At step 502, processing may be performed to configure a first R1-R2 device pair for LUN A for active-active synchronous replication, and configure a second R3-R4 device pair for LUN B for active-active synchronous replication. At step 504, LUN A/R1-R2 device pair may be used for sending communications from host 1 2110a to host 2 2110b. At step 506, LUN B/R3-R4 device pair may be used as the means for sending communications from host 2 2110b to host 1 2110a. As described herein, the communications sent between the hosts 2110a-b in steps 504 and 506 may be from instances of a distributed or clustered application on each of the hosts 2110a-b. Such communications may be, for example, sent to coordinate control, sharing, and the like, of storage resources used concurrently by the instances of a distributed or clustered application on the hosts 2110a-b.

Figure 9:
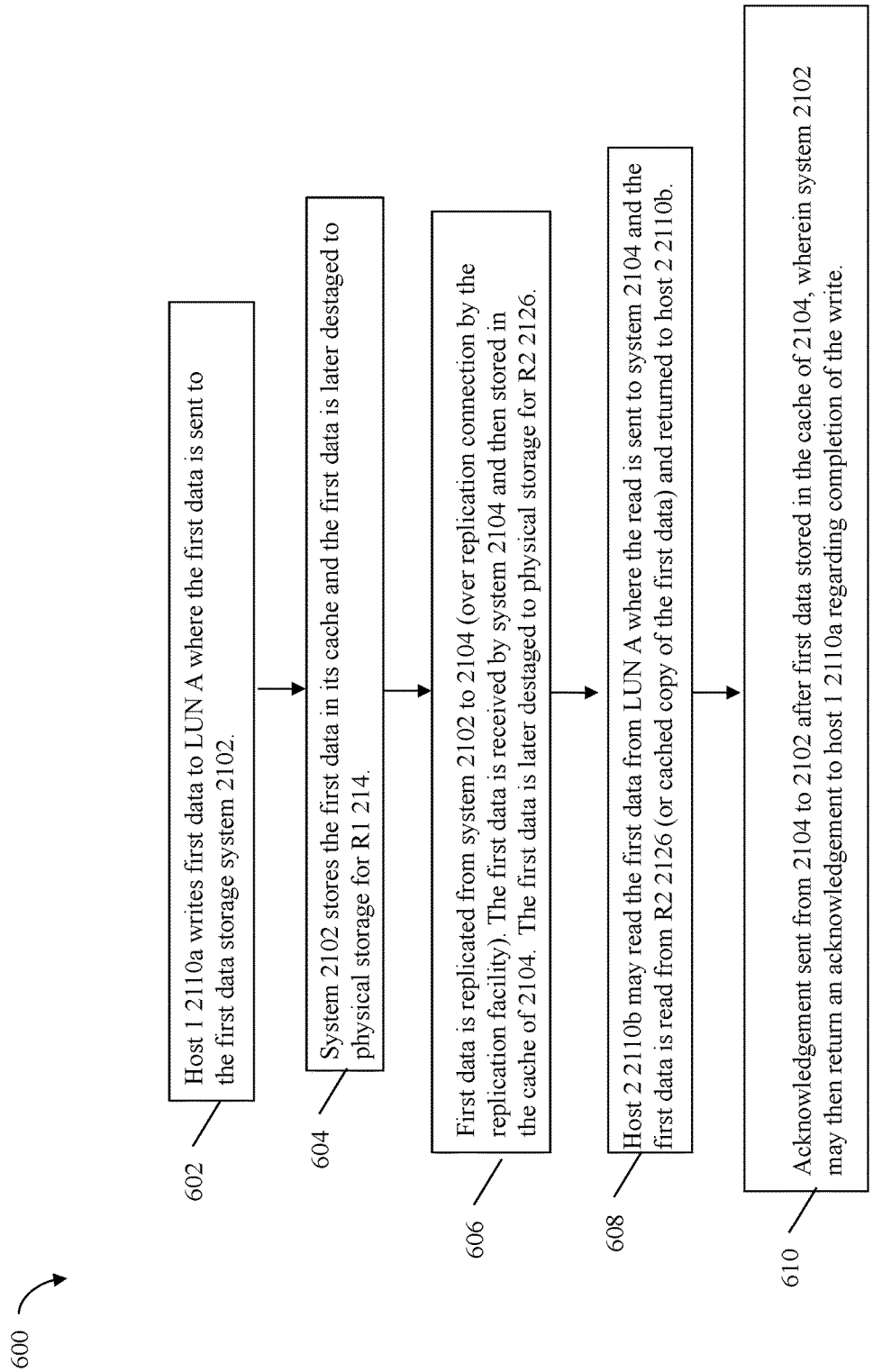

Referring to FIG. 9, shown is a second flowchart 600 of processing steps that may be performed in an embodiment in accordance with techniques herein. The flowchart 600 provides further detail regarding step 504 of FIG. 8. At step 602, Host 1 2110a writes first data to LUN A where the first data is sent to the first data storage system 2102. At step 604, system 2102 stores the first data in its cache and the first data is later destaged to physical storage for R1 214. At step 606, the first data is replicated from system 2102 to 2104 (over replication connection by the replication facility). The first data is received by system 2104 and then stored in the cache of 2104. The first data is later destaged to physical storage for R2 2126. At step 608, the host 2 2110b may read the first data from LUN A, where the read is sent to system 2104 and the first data is read from R2 2126 (or cached copy of the first data) and returned to host 2 2110b. At step 610, an acknowledgement sent from 2104 to 2102 after first data stored in the cache of 2104, wherein system 2102 may then return an acknowledgement to host 1 2110a regarding completion of the write.

Figure 10:
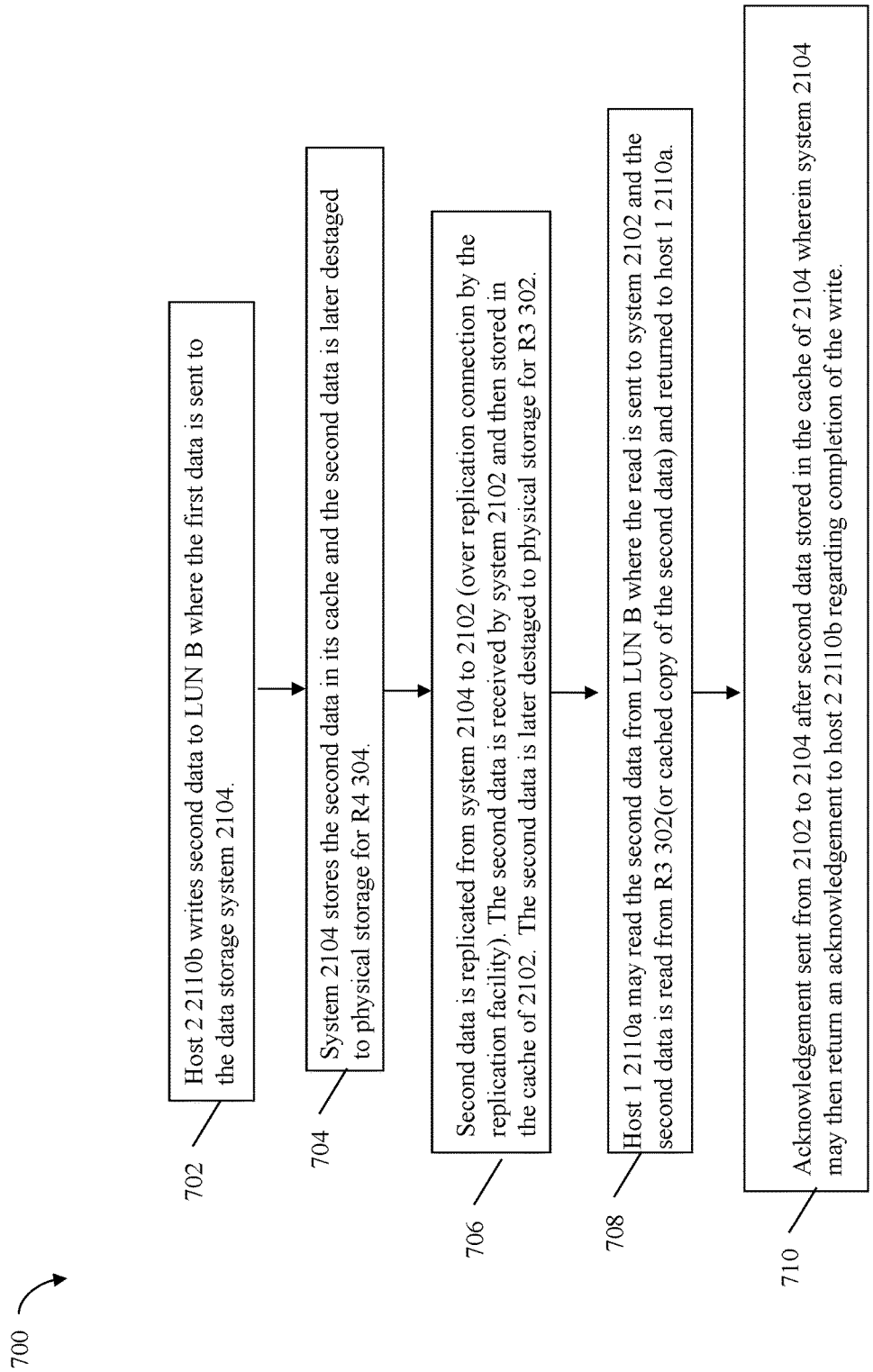

Referring to FIG. 10, shown is a third flowchart 700 of processing steps that may be performed in an embodiment in accordance with techniques herein. The flowchart 700 provides further detail regarding step 506 of FIG. 8. At step 702, host 2 2110b writes second data to LUN B where the first data is sent to the data storage system 2104. At step 704, system 2104 stores the second data in its cache and the second data is later destaged to physical storage for R4 304. At step 706, the second data is replicated from system 2104 to 2102 (over replication connection by the replication facility). The second data is received by system 2102 and then stored in the cache of 2102. The second data is later destaged to physical storage for R3 302. At step 708, host 1 2110a may read the second data from LUN B where the read is sent to system 2102 and the second data is read from R3 302 (or cached copy of the second data) and returned to host 1 2110a. At step 710, an acknowledgement is sent from 2102 to 2104 after second data stored in the cache of 2104 wherein system 2104 may then return an acknowledgement to host 2 2110b regarding completion of the write.

Figure 11:
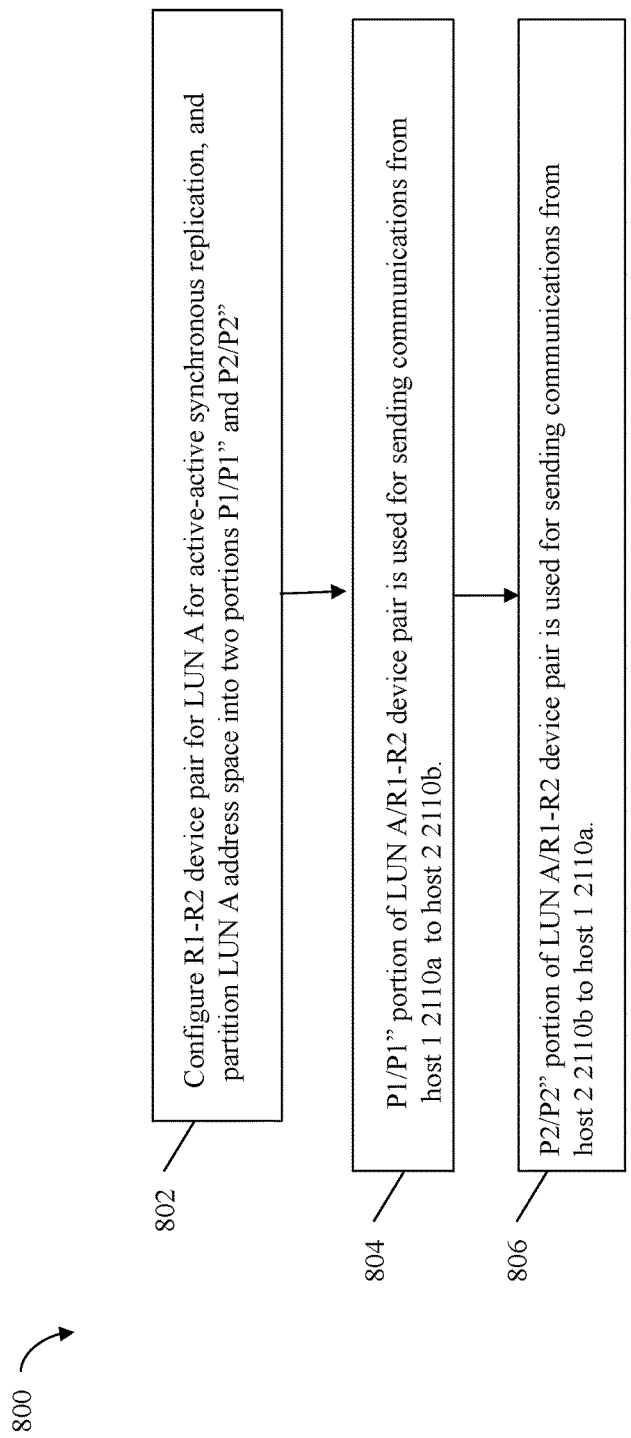

Referring to FIG. 11, shown is a fourth flowchart 800 of processing steps that may be performed in an embodiment in accordance with techniques herein, such as described in connection with FIG. 7. At step 802, processing may be performed to configure the R1-R2 device pair for LUN A for active-active synchronous replication, and partition LUN A's logical address space into two portions P1/P1" and P2/P2". As noted above, P1 may include those portions of LUN A's address space used exclusively for communications sent from host 1 2110a to host 2 2110b, and P2 may include those portions of LUN A's address space used exclusively for communications sent from host 2 2110b to host 1 2110a. P1 may denote LUN A address space portion on the configured R1 logical device for LUN A; P2 may denote LUN A address space portion on the configured R1 logical device for LUN A; P1" may denote the same LUN A address space portion as P1 whereby P1" is on the configured R2 logical device for LUN A; P2" may denote the same LUN A address space portion as P2 whereby P2" is on the configured R2 logical device for LUN A. At step 804, the P1/P1" portion of LUN A/R1-R2 device pair is used for sending communications from host 1 2110a to host 2 2110b. At step 806, the P2/P2" portion of LUN A/R1-R2 device pair is used for sending communications from host 2 2110b to host 1 2110a. It should be noted that more detailed processing of step 804 may be similar to that as described in connection with FIG. 9 with the difference that writes by host 1 2110a (and associated reads by host 2 2110b) are made only to logical addresses in P1/P1". Similarly, more detailed processing of step 806 may be similar to that as described in connection with FIG. 10 with the difference that writes by host 2 2110b (and associated reads by host 1 2110a) are made only to logical addresses in P2/P2".

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing inter-host communication comprising:
   issuing a first message from a first host;
      and sending the first message from the first host to a second host, wherein said sending includes:
         transmitting the first message indirectly to the second host over a first connection between a first data storage system and a second data storage system, wherein a first device of the first data storage system and a second device of a second data storage are configured as a same logical device, a first logical device, and wherein the first connection is used for synchronous data replication to maintain the second device of the second data storage system as a synchronous mirror of the first device of the first data storage system, wherein the first host issues a first write that writes the first message to the first logical device over a first path between the first host and the first data storage system, and the second host issues a first read to the first logical device over a second path between the second host and the second data storage system, wherein the first logical device is used exclusively in connection with sending messages from the first host to the second host, and wherein a second logical device, that is different from the first logical device, is used exclusively in connection with sending messages from the second host to the first host, wherein a third device of the first data storage system and a fourth device of the second data storage system are configured as a same logical device, the second logical device, that is different from the first logical device, and wherein messages sent from the second host to the first host are transmitted indirectly over a second connection between the first data storage system and the second data storage system, wherein the first connection and the second connection are two different connections.

2. The method of claim 1, wherein the first message includes first data, and said sending the first message includes issuing the first write that writes the first data to a first logical address of the first logical device.

3. The method of claim 2, wherein the second host receives the first message by issuing the first read to read the first data from the first logical device, said first read being sent from the second host to the second data storage system.

4. The method of claim 1, further comprising:
issuing a second message from the second host; and
sending the second message from the second host to the first host, wherein said sending the second message includes:
transmitting the second message indirectly to the first host over the second connection between the first data storage system and the second data storage system, and wherein the second connection is used for synchronous data replication to maintain the fourth device of the second data storage system as a synchronous mirror of the third device of the first data storage system.

5. The method of claim 4, wherein the second message includes second data, and said sending the second message includes issuing a second write that writes the second data to a second logical address of the second logical device.

6. The method of claim 5, wherein the first host receives the second message by issuing a second read to read the second data from the second logical device, said second read being sent from the first host to the first data storage system.

7. The method of claim 1, wherein there is no direct communication connection between the first host and the second host.

8. The method of claim 7, wherein the first host has a direct connection to the first data storage system and does not have a direct connection to the second data storage system.

9. The method of claim 8, wherein the second host has a direct connection to the second data storage system and does not have a direct connection to the first data storage system.

10. A method of performing inter-host communication comprising:
issuing a first message from a first host,
and sending the first message from the first host to a second host, wherein said sending includes:
transmitting the first message indirectly to the second host over a first connection between a first data storage system and a second data storage system, wherein a first device of the first data storage system and a second device of a second data storage are configured as a same logical device, a first logical device, and wherein the first connection is used for synchronous data replication to maintain the second device of the second data storage system as a synchronous mirror of the first device of the first data storage system, wherein the first host issues a first write that writes the first message to the first logical device over a first path between the first host and the first data storage system, and the second host issues a first read to the first logical device over a second path between the second host and the second data storage system, and wherein the first logical device has a logical address space and a first portion of the logical address space is used exclusively in connection with sending messages from the first host to the second host, and a second portion of the logical address space, that is different than the first portion of the logical address space, is used exclusively in connection with sending messages from the second host to the first host, and wherein the first write is a first request to write the first data to a first logical address of the first portion.

11. The method of claim 10, further comprising:
issuing a second message from the second host; and
sending the second message from the second host to the first host, wherein said sending the second message includes:
transmitting the second message indirectly to the first host over the first connection between the first data storage system and the second data storage system.

12. The method of claim 11, wherein the second message includes second data, and said sending the second message includes issuing a second write that writes the second data to a second logical address of the first logical device, wherein said second logical address is included in the second portion.

13. The method of claim 12, wherein the first host receives the second message by issuing a second read to read the second data from the second logical address of the second portion, said second read being sent from the first host to the first data storage system.

14. The method of claim 13, wherein the first host and the second host each include an instance of a distributed or clustered application and wherein the first message is issued by a first instance of the distributed or clustered application on the first host and the second message is issued by a second instance of the distributed or clustered application on the second host, wherein the first message and the second message are issued in connection with any of coordinating access and control of storage resources used concurrently by the distributed or clustered application.

15. A system comprising:
a first host;
a second host;
a first data storage system;
a second data storage system;
and one or more memories comprising code stored thereon that, when executed, perform a method comprising:
configuring a first device of the first data storage system and a second device of the second data storage system for synchronous replication, wherein the first device and the second device are configured as a same logical device, a first logical device, wherein a first connection between the first data storage system and the second data storage system is used to transmit data, written to the first logical device, between the first data storage system and the second data storage system in order to maintain the second device as a synchronous mirror of the first device of the first data storage system, wherein the first host issues a first write to the first logical device over a first path between the first host and the first data storage system and the second host issues a first read to the first logical device over a second path between the second host and the second data storage system;

configuring a third device of the first data storage system and a fourth device of the second data storage system for synchronous replication, wherein the third device and the fourth device are configured as a same logical device, a second logical device, wherein a second connection, that is different than the first connection and is between the first data storage system and the second data storage system is used to transmit data, written to the second logical device, between the first data storage system and the second data storage system in order to maintain the fourth device as a synchronous mirror of the third device of the first data storage system, wherein the first host issues a second read to the second logical device over a third path between the first host and the first data storage system and the second host issues a second write to the second logical device over a fourth path between the second host and the second data storage system;

performing first processing in connection with the first write directed to the first logical device, wherein the first write is issued by the first host over the first path to the first data storage system, wherein the first write writes first data that is a first message to the second host, wherein said first processing includes sending the first data over the first connection to the second data storage system, wherein the first logical device is used exclusively in connection with sending messages from the first host to the second host;

and performing second processing in connection with the second write directed to the second logical device, wherein the second write is issued by the second host over the fourth path to the second data storage system, wherein the second write writes second data that is a second message to the first host, wherein said second processing includes sending the second data over the second connection to the second data storage system, wherein the second logical device is different from the first logical device and wherein the second logical device is used exclusively in connection with sending messages from the second host to the first host.

16. The system of claim 15, wherein there is no direct communication connection between the first host and the second host.

17. The system of claim 16, wherein the first host has a direct connection to the first data storage system and does not have a direct connection to the second data storage system, and wherein the second host has a direct connection to the second data storage system and does not have a direct connection to the first data storage system.

18. A computer readable medium comprising code stored thereon that, when executed, performs a method of performing inter-host communication comprising:

issuing a first message from a first host;

and sending the first message from the first host to a second host, wherein said sending includes:

transmitting the first message indirectly to the second host over a first connection between a first data storage system and a second data storage system, wherein a first device of the first data storage system and a second device of a second data storage are configured as a same logical device, a first logical device, and wherein the first connection is used for synchronous data replication to maintain the second device of the second data storage system as a synchronous mirror of the first device of the first data storage system, wherein the first host issues a first write that writes the first message to the first logical device over a first path between the first host and the first data storage system, and the second host issues a first read to the first logical device over a second path between the second host and the second data storage system, wherein the first logical device is used exclusively in connection with sending messages from the first host to the second host, and wherein a second logical device, that is different from the first logical device, is used exclusively in connection with sending messages from the second host to the first host, wherein a third device of the first data storage system and a fourth device of the second data storage system are configured as a same logical device, the second logical device, that is different from the first logical device, and wherein messages sent from the second host to the first host are transmitted indirectly over a second connection between the first data storage system and the second data storage system, wherein the first connection and the second connection are two different connections.

* * * * *